Sept. 10, 1968

M. A. ENGLE ET AL 3,401,267

YARN BREAKAGE DETECTOR

Filed June 26, 1964

MILTON A. ENGLE
JACK W. RAQUET
INVENTORS.

KENDRICK AND STOLZY

BY

ATTORNEYS

MILTON A. ENGLE
JACK W. RAQUET
INVENTORS.
KENDRICK AND STOLZY
BY
ATTORNEYS

FIG. 9B.

United States Patent Office 3,401,267
Patented Sept. 10, 1968

3,401,267
YARN BREAKAGE DETECTOR
Milton A. Engle, 4907 Alcove Ave., North Hollywood, Calif. 91607, and Jack W. Raquet, 8416 Madison, South Gate, Calif. 90280
Filed June 26, 1964, Ser. No. 378,164
6 Claims. (Cl. 250—219)

ABSTRACT OF THE DISCLOSURE

The invention involves the use of photoelectric apparatus to detect yarn breakage in an automatic loom along a path, wherein a light trap is located at each end of the path. One light trap is empty and the other contains a telescope and photocell. It is critical to the invention that the light trap around the telescope extend beyond the end of the telescopic lens a distance to minimize the amount of ambient light not reflected from yarn which can reach the photocell. This keeps the noise of the system to a level which can be tolerated.

---

This invention relates to the art of detecting radiation, and more particularly, to an arrangement for detecting the presence of or absence of an extremely small body located at any position along a straight field of view having a length which may be in excess of one hundred thousand times the width of the body.

Although the device of the present invention will have other applications and should not therefore be limited to those disclosed herein, the invention has been found to have special utility in automatically shutting down a motor driven loom when yarn threaded thereinto from any one of numerous supply spools breaks.

The art of weaving is an ancient one, but like many such arts, it has been automated, at least in part. Prior art automatic weaving equipment has included means for tautly positioning an approximately parallel set of yarn filaments, such as warp filaments, in a flat plane so that other filaments, for example, woof filaments, can be interwoven with the warp.

It frequently happens that a piece of yarn breaks and pops out of position. One broken warp end has a tendency to entangle itself with adjacent warp ends. This results in additional warp breakage. Situations of this type result in lower loom efficiency.

In accordance with the foregoing, it is important in the art of automatic weaving to detect a break in a strand of yarn as soon as possible. In the past, it has been necessary to burden the weaver with this duty. This is not only an expensive method of solving the problem, but also an unreliable one. That is, it is difficult for a weaver to determine either accurately or rapidly whether or not one or more warp strands have broken in a loom. This is due to the fact that perhaps 12,000 or more strands may be positioned along a loom within a distance of 18 feet. Further, each strand may be approximately 0.006 inch in diameter.

The problem posed by detecting with one photocell the passage of something so very small as a piece of yarn at any position along an extremely long optical path in an ordinary amount of ambient light is enormous. The chief reason that this problem is so great is that, in a moderate amount of light, it is ordinarily impossible to determine whether the light intercepted by the photocell is being reflected from a piece of yarn or whether the light intercepted by the photocell is emanating from or being reflected from some background object which is not a piece of yarn. Restated, the problem is to distinguish between light reflected from a piece of yarn and all other light.

The present invention provides a number of solutions to this problem. One outstanding solution to this problem is to provide a black or light absorptive background. Thus, the photocell can look through a hole into the darkness of an otherwise enclosed space inside a box that has a light absorptive or radiation absorptive surface. By so limiting the amount of light which can enter the photocell, the sensitivity of the photocell can be increased to such a high degree that an extremely small amount of light may be detected at a great distance even though a moderate amount of ambient light exists. The present invention thus makes it possible to distinguish a minute amount of light from a large amount of other background light of, for example, an identical intensity.

The present invention is, of course, more sensitive than conventional electric eye systems in that a piece of yarn passing between a photocell and a light source aligned therewith would interrupt such a small amount of the light emanating from the source that the passage of the yarn could not be detected. Sensitivity could be improved by employing a light source capable of producing a highly collimated and an extremely small light beam of an extremely large intensity. However, the large power requirements of such a light source would most certainly be absurd. Further, note will be taken that the light source of the present invention is a common, inexpensive fluorescent lamp.

Although attempts have been made to provide automatic detectors for warp breakage not requiring the attention of a human operator, these attempts have generally failed. In these cases, a single detector has been required for each strand of warp to produce a reliable breakage signal, and this number of detectors has been impractical. It would be necessary to hang what is known as a metal drop wire on each and every strand. These drop wires have a tendency to chafe the yarn.

Although highly sensitive light detection apparatus has been employed for laboratory experiments for years in such a field as theoretical physics, to the present time, no successful application of such apparatus to the yarn breakage detector art has been made.

For example, in Sections 160 and 177 of a book entitled "Foundations of Modern Physics" by Thomas B. Brown (New York, John Wiley & Sons, Inc.; London, Chapman and Hall, Ltd., 1940), a device is disclosed for detecting the light scattering effect of a liquid in which a spectrograph is employed. A spectroscope, a device in the nature of a spectrograph, may incorporate an optical system for examining light at close range after it has passed through a prism included therein. Unlike the invention, this system spreads a light beam and does not merely focus it. Further, the system of the present invention employs a telescope which necessarily differs from the spectroscope in having a long, narrow field of view.

In accordance with the present invention, the above-described and other disadvantages of the prior art are overcome by locating a telescope and a radiation sensitive detector in alignment with an opening in a hollow radiation absorptive body, the body having only the said one opening thereinto. Thus, the telescope, due to the nature of its construction, may severely limit light passed to the detector. That is, the field of view of the telescope may be cylindrical or conical and of a size smaller than or equal to that of a cylinder having a diameter of one inch and a length of 18 feet. The telescope characteristic long, narrow field of view and the high radiation absorption characteristic of the body makes the device of the present invention so sensitive that, for example, the passage of a 0.006 inch piece of yarn through a field of view anywhere along an 18 foot length thereof may produce a signal to no-signal current ratio of from 2 to 1, to approximately 10 to 1.

It is another outstanding feature of the present invention that special structures are employed effective to prevent radiation from entering the detector in the absence of a body in the telescope field of view, even though radiation sources outside of the field of view are especially powerful.

Still another outstanding feature of the present invention resides in the use of a fluorescent lamp to illuminate objects in the telescope field of view. A sixty cycle per second power line source causes a one hundred twenty cycle per second ripple in the light output from the lamp. This makes it possible to employ a stable alternating current amplifier at the output of a photoelectric cell employed in one embodiment of the apparatus of the present invention.

The above-described and other advantages of the present invention will be better understood from the following description when considered in connection with the accompanying drawings.

In the drawings which are to be regarded as merely illustrative.

Figure 1:
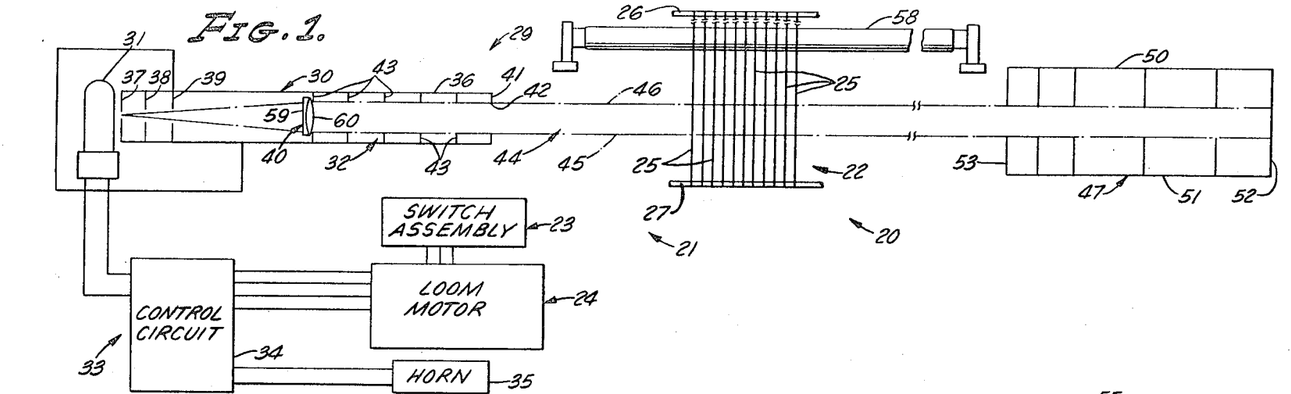
FIGS. 1 and 1A are schematic views of a yarn breakage detector system constructed in accordance with the present invention.

In FIG. 1, the system of the present invention is indicated generally at 20. Also shown in FIG. 1 is a portion of an automatic loom indicated at 21. Loom 21 includes a warp retaining structure 22, a switch assembly 23 and a loom motor 24. Warp retaining structure 22 supports a plurality of threads 25 which are stretched between upper and lower rods 26 and 27. Threads 25 extend over the top of upper rod 26 and in a plane perpendicular to the paper of the drawing of FIG. 1 and tangent to the upper side of rod 26. Similarly, threads 25 also extend in a horizontal plane perpendicular to the plane of the paper in FIG. 1 and tangent to the lower side of lower rod 27. As it happens, a thread 25 always breaks in the said horizontal plane tangent to lower square baffles 43 that have circular holes in them. Baffles 43 may be substantially identical to end plate 42. Telescope 32 has a field of view 44 which may have a shape approximately as indicated between lines 45 and 46.

A background box 47 is positioned to intercept field of view 44. Box 47 has rectangular sides 48 and 49, a rectangular top 50, a rectangular bottom 51 and a square end plate 52. All of the plates 48, 49, 50, 51 and 52 may be solid. Box 47 has a forward end plate 53 which has a circular hole therethrough of a size approximately the same as that of the holes in plate 41 and baffles 43 of telescope 32.

Further, box 47 similarly has baffles at 54, 55, 56 and 57 which are square and which are substantially identical to end plate 53. Note will be taken that end plate 53 and baffle 54 are spaced rather close together. Baffles 54 and 55 are spaced apart a distance somewhat greater than the distance between end plate 53 and baffle 54. Baffles 55, 56 and 57 are spaced distances apart still greater than the spacings of the baffles forward thereof.

As might be expected, light reflected from a broken thread 25 is detected by means 29, although special lighting may be avoided in certain cases, for rod 27. When a thread 25 snaps in this plane, the vertical portion of the broken thread 25 will move in a direction away from the plane of the paper in FIG. 1 and away from rod 27. This movement normally takes place rather rapidly. However, the system 20 of the present invention operates independently of the rate of movement of a thread 25 after it breaks. In any event, when a thread 25 breaks, the vertical portion thereof will move generally in a direction as indicated by an arrow 28 in FIG. 1A.

Figure 1A:
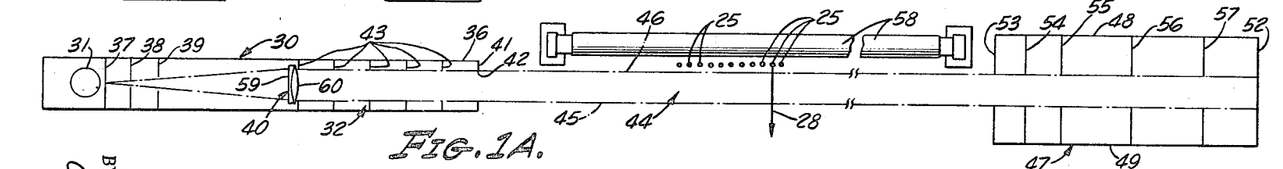

Although both FIGS. 1 and 1A are schematic views, in general the mechanical portion of FIG. 1 is an elevation view and the mechanical portion of FIG. 1A is a top plan view.

The system of the present invention includes detector means 29 comprising a housing 30 for a photocell 31 and a telescope 32, and control means 33. Control means 33 includes a control circuit 34 and a horn 35.

Telescope 32 has a square elongated hollow enclosure 36 around it. Stops are provided at 37, 38 and 39 in this enclosure. Telescope 32 has a lens positioned at 40. Enclosure 36 has a square end plate 41 which has a circular hole 42 therethrough. Enclosure 36 is also provided with five equally spaced square baffles 43 that have circular holes in them. Baffles 43 may be substantially identical to end plate 41. Telescope 32 has a field of view 44 which may have a shape approximately as indicated between lines 45 and 46.

A background box 47 is positioned to intercept field of view 44. Box 47 has rectangular sides 48 and 49, a rectangular top 50, a rectangular bottom 51 and a square end plate 52. All of the plates 48, 49, 50, 51 and 52 may be solid. Box 47 has a forward end plate 53 which has a circular hole therethrough of a size approximately the same as that of the holes in plate 41 and baffles 43 of telescope 32.

Further, box 47 similarly has baffles at 54, 55, 56 and 57 which are square and which are substantially identical to end plate 53. Note will be taken that end plate 53 and baffle 54 are spaced rather close together. Baffles 54 and 55 are spaced apart a distance somewhat greater than the distance between end plate 53 and baffle 54. Baffles 55, 56 and 57 are spaced distances apart still greater than the spacings of the baffles forward thereof.

As might be expected, light reflected from a broken thread 25 is detected by means 29. Although special lighting may be avoided in certain cases, for reliability, and in accordance with a special feature of the present invention, a conventional fluorescent lamp 58 is provided to illuminate any thread 25 that breaks and passes through field of view 44.

As shown in FIG. 1, control circuit 34 is connected from photocell 31 to loom motor 24 and to horn 35. Switch assembly 23 is also connected to loom motor 24.

In the operation of the present invention, switch assembly 23 is operated to start loom motor 24. Closing of switch 187 shown in FIG. 9A energizes regulating transformer 183 which supplies regulated power to transformers 190 and 191 and the fluorescent lamp 58. If during the operation of loom 21, a thread 25 should break and cross field of view 44 taking a path the same as or similar to that of path 28, light emanating from lamp 58 will then be reflected from the broken thread in field of view 44 and be focused by lens 40 through housing 30 on photocell 31. Control circuit 34 will thereby be energized immediately and turn horn 35 on momentarily to signal a weaver of a thread break and turn loom motor 24 off automatically.

Figures 2, 10:
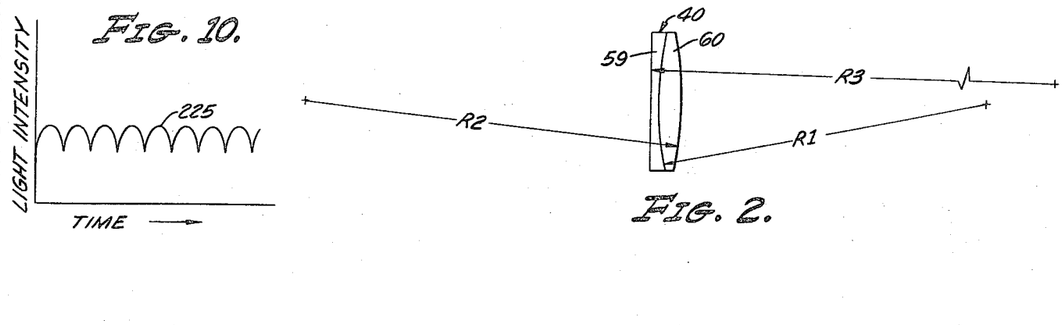
FIG. 2 is a longitudinal sectional view of a lens constructed in accordance with the present invention.
FIG. 10 is a graph of the intensity of the light output of a lamp shown in FIG. 1 plotted as a function of time.

As shown in FIG. 2, lens 40 may be a doublet lens having parts at 59 and 60. Lens 40 may have the following prescription:

$R_1$ ---------------------------------------- mm__ −52
$R_2$ ---------------------------------------- mm__ +52
$R_3$ ---------------------------------------- Infinity
Focal length _________________________ mm__ 125±2
Diameter ____________________________ mm__ 32.9±0.1–0.0
Glass BK 7 cemented to CR 39.

where $R_1$, $R_2$ and $R_3$ are radii defining lens curvature as indicated in FIG. 2.

The drawings of FIGS. 3, 4, 5, 6 and 7 are mechanical views. The structure illustrated in these views may be actually constructed in the proportions indicated. The system 20 was designed for a distance between field of view lines 45 and 46 of one inch.

The extended lengths of enclosure 36 and box 47 and the baffles keep out stray light and thereby make the system 20 unusually sensitive. Further, the interior of telescope 32 and the interior and exterior of box 47 are all painted a dull black to increase this sensitivity still further.

Figures 3, 4, 7:
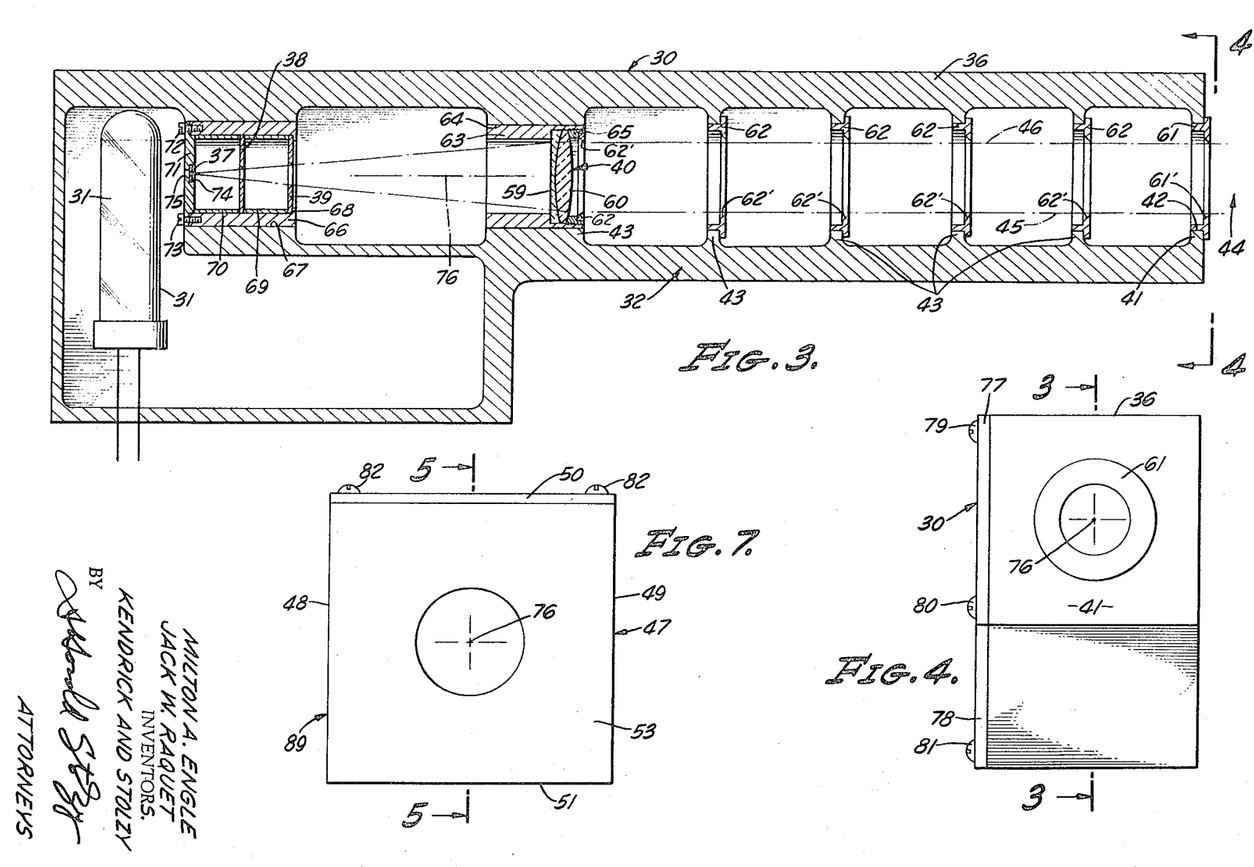
FIG. 3 is a longitudinal sectional view of a light detector shown in FIG. 1 taken on the line 3—3 shown in FIG. 4 and drawn to scale.
FIG. 4 is a right end elevational view of the detector taken on the line 4—4 shown in FIG. 3.
FIG. 7 is a left end elevational view of the absorber of FIGS. 5 and 6 taken on the line 7—7 shown in FIG. 5.

An insert 61 is provided in hole 43 through end plate 41, as shown in FIG. 3. Similar inserts 62 are provided in holes in baffles 43. In accordance with the present invention, the field of view 44 of telescope 32 is protected from extraneous light by a beveled edge 62′ in holes in each of the inserts 62, and a similarly beveled edge 61′ in a hole in insert 61.

A sleeve 63 is held by a set screw, not shown, in a bore 64 in telescope 32. Sleeve 63 carries lens 40, lens 40 being held therein by an annular ring 65 threaded into sleeve 63.

A sleeve 66 is held by a set screw, not shown, in a second bore 67 of telescope 32. Sleeve 66 has a lip 68 against which stop 39 is located. A cylinder 69 spaces stops 38 and 39. A similar cylinder 70 is positioned between a disc 71 and stop 38. Disc 71 is fixed to sleeve 66 by metal screws 72 and 73. Stop 37 is press fit into a bore 74 in disc 71. Light passing through field stop 37 also passes through a bore 75 in discs 71.

A stop 62′ is also located in housing 30 approximately at the position of bore 64 therein.

The optical axis of telescope 32 is indicated at 76 in FIG. 3. It will be appreciated that enclosure 36, as stated previously, is square. For this reason, the portion of the telescope 32 to the right of bore 64 is perfectly symmetrical about optical axis 76, neglecting access plate or cover 77 and screws 79, 80 and 81.

As shown in FIG. 4, access to housing 30 may be obtained through side plate 77. Side plate 77 is held to housing 30 by metal screws 79, 80 and 81.

Figure 5:
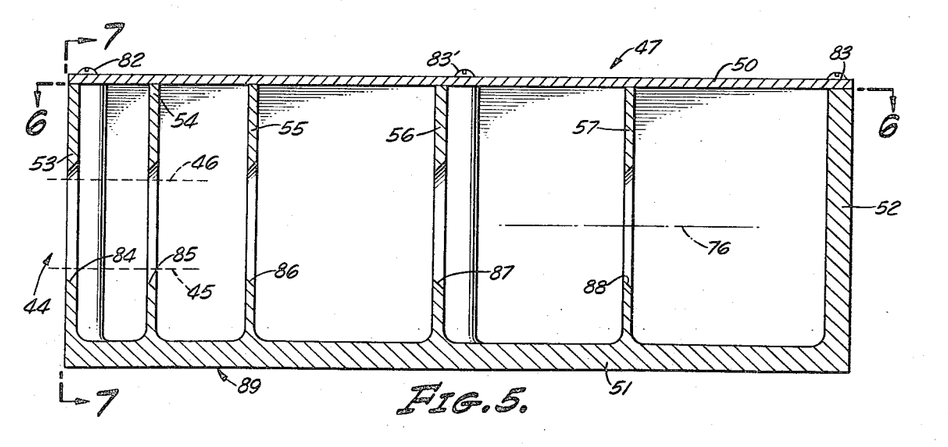
FIG. 5 is a longitudinal sectional view of a light absorber shown in FIG. 1 taken on the line 5—5 shown in FIG. 7.

As shown in FIG. 5, box 47 may be perfectly symmetrical about optical axis 76, except for top plate 50 and screws 82, 83 and 83′. Note will be taken from FIG. 5, that top plate 50 is held in place by metal screws 82, 83 and 83′. The hole in end plate 53 is beveled at 84. The holes in baffles 54, 55, 56, and 57 are beveled at 85, 86, 87 and 88, respectively. The purpose of the bevels at 84, 85, 86, 87 and 88 is the same as that for the bevels 61′ and 62′ of insert 61 and 62, respectively. Also as shown in FIG. 5, box 47 has a body 89 over which top plate 50 acts as a cover.

Figure 6:
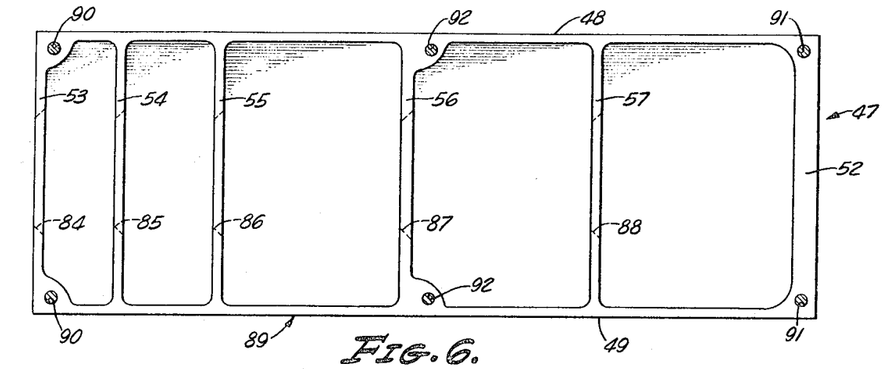
FIG. 6 is a top plan view of a portion of the absorber taken on the line 6—6 shown in FIG. 5.

Note will be taken from FIG. 6 that body 89 has tapped holes 90, 91 and 92 into which screws 82, 83 and 83′ are respectively threaded.

Figure 8:
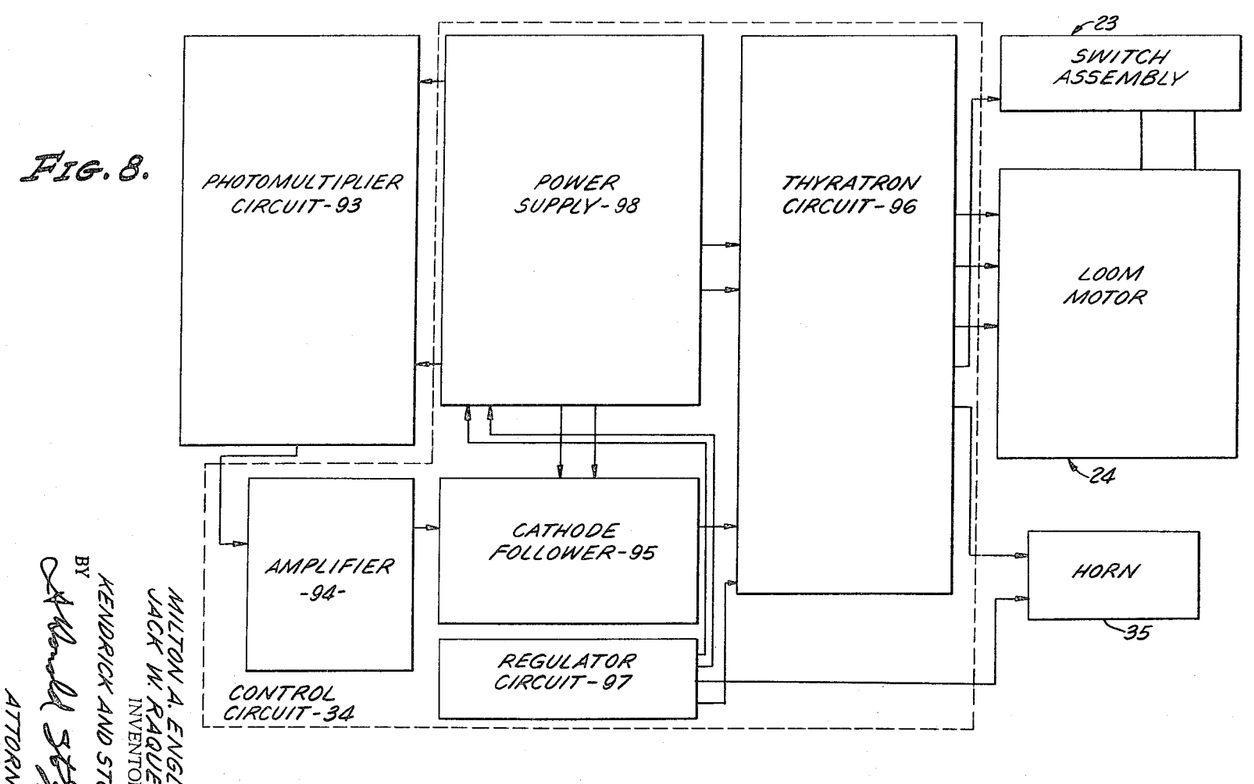
FIG. 8 is a detailed block diagram of a circuit shown in FIG. 1.

Control circuit 34 is shown in FIG. 8 with switch assembly 23, loom motor 24 and horn 35. A photomultiplier circuit 93 is also shown in FIG. 8. Photomultiplier circuit 93 includes photocell 31 as will be explained.

An amplifier 94 is connected from the output of photomultiplier circuit 93 to a cathode follower 95. A thyratron circuit 96 is connected from the output of cathode follower 95 to loom motor 24. Switch assembly 23 is connected to both thyratron circuit 96 and loom motor 24. A regulator circuit is provided at 97, which regulator circuit 97 is connected to both a power supply 98 and fluorescent lamp 58. Power supply 98 is connected to photomultiplier circuit 93, cathode follower 95 and thyratron circuit 96. Thyratron circuit 96 is connected not only to switch assembly 23 and loom motor 24, but also to horn 35.

In the operation of the circuit illustrated in the block diagram of FIG. 8, regulator circuit 97 provides a regulated input voltage to power supply 98.

Switch assembly 23 is actuated to turn on loom motor 24. When a thread 25 passes through field of view 44, the output of photocell 31 changes. Photomultiplier circuit 93 then produces an output signal which is impressed upon cathode follower 95 through amplifier 94. Thyratron circuit 96, responsive to the output of cathode follower 95, turns off loom motor 24 and sounds horn 35 momentarily.

Figure 9A:
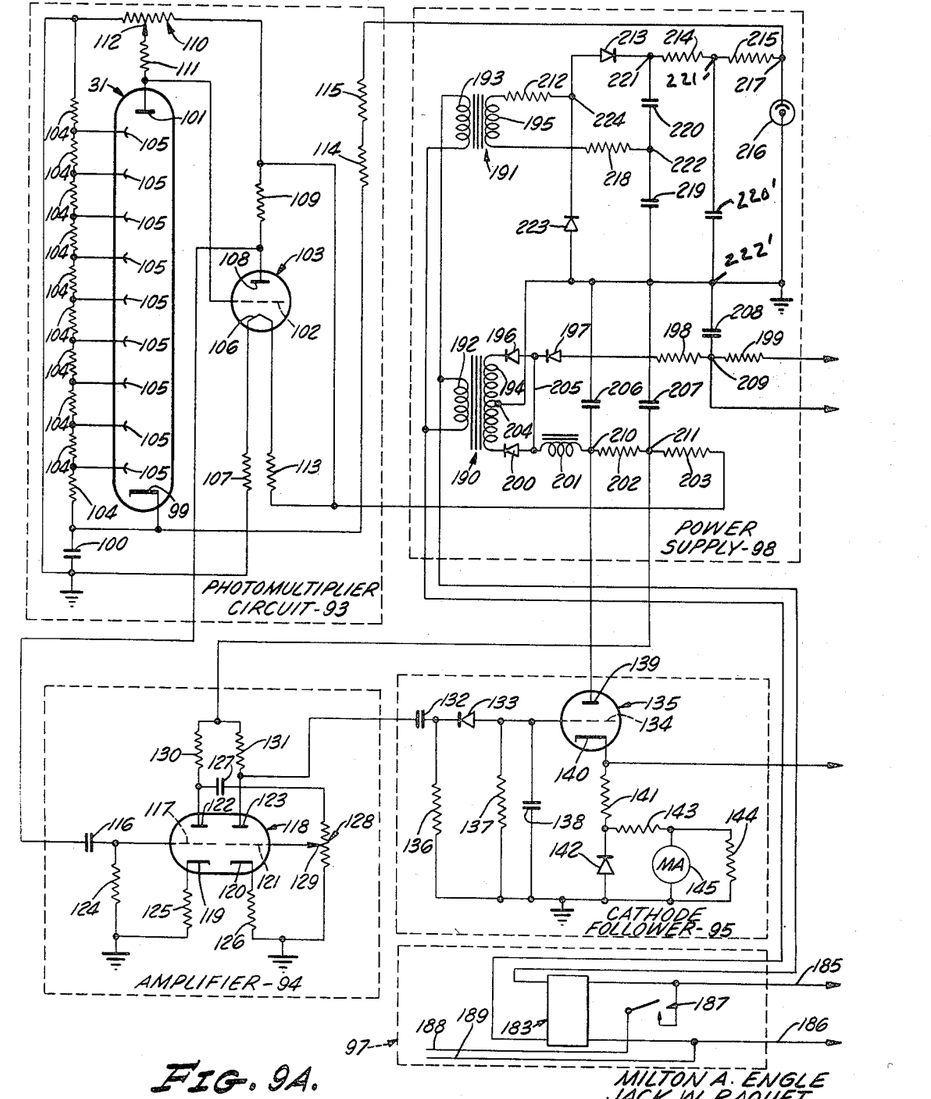
FIG. 9A and 9B are schematic diagrams of circuits shown in the block diagrams of circuits shown in the block diagram of FIG. 8.

As shown in FIG. 9A, photocell 31 is provided in photomultiplier circuit 93. Photocell 31 has a cathode 99 which is connected through a capacitor 100 to ground. Photocell 31 has an anode 101 which is connected to a grid 102 of a triode amplifier 103. A series connection of a plurality of resistors 104 are connected in parallel with capacitor 100. The mutual junction of each adjacent pair of resistors 104 is connected to a separate one of a plurality of dynodes 105 in photocell 31. Triode 103 has a filament cathode 106 connected through a resistor 107 to ground. Triode 103 also has an anode 108 which is connected to power supply 98 through a series connected resistor 109. A potentiometer 110 provides a source of positive bias for grid 102. A resistor 111 is connected from photocell anode 101 to a movable tap 112 on potentiometer 110. A resistor 113 is also connected from filament 106 to power supply 98. Photocell cathode 99 is also connected to power supply 98 through two series resistors 114 and 115.

The output of photomultiplier circuit 93 at the anode 108 of triode 103 is impressed upon amplifier 94 through a coupling capacitor 116 which is connected to a grid 117 of a dual triode 118. Triode 118 has cathodes 119 and 120, grids 117 and 121, and anodes 122 and 123. A resistor 124 is connected from grid 117 to ground. A resistor 125 is connected from cathode 119 to ground. A resistor 126 is connected from cathode 120 to ground. A capacitor 127 is connected from anode 122 through a potentiometer 128 to ground. Potentiometer 128 has a movable tap 129 that is connected to grid 121. Anodes 122 and 123 are respectively connected to power supply 98 through resistors 130 and 131.

A capacitor 132 and a diode 133 are connected serially from anode 123 in amplifier 94 to a grid 134 of a triode 135 in cathode follower 95. A resistor 136 is connected from the mutual junction of capacitor 132 and diode 133 to ground. A resistor 137 is connected from grid 134 to ground. A capacitor 138 is also connected from grid 134 to ground.

Triode 135 has an anode 139 that is connected to power supply 98 and a cathode 140. A resistor 141 and a diode 142 are connected serially from cathode 140 to ground. Resistors 143 and 144 are connected serially to ground from the mutual junction of resistor 141 and diode 142. A milliammeter 145 is connected in parallel with resistor 144.

Figure 9B:
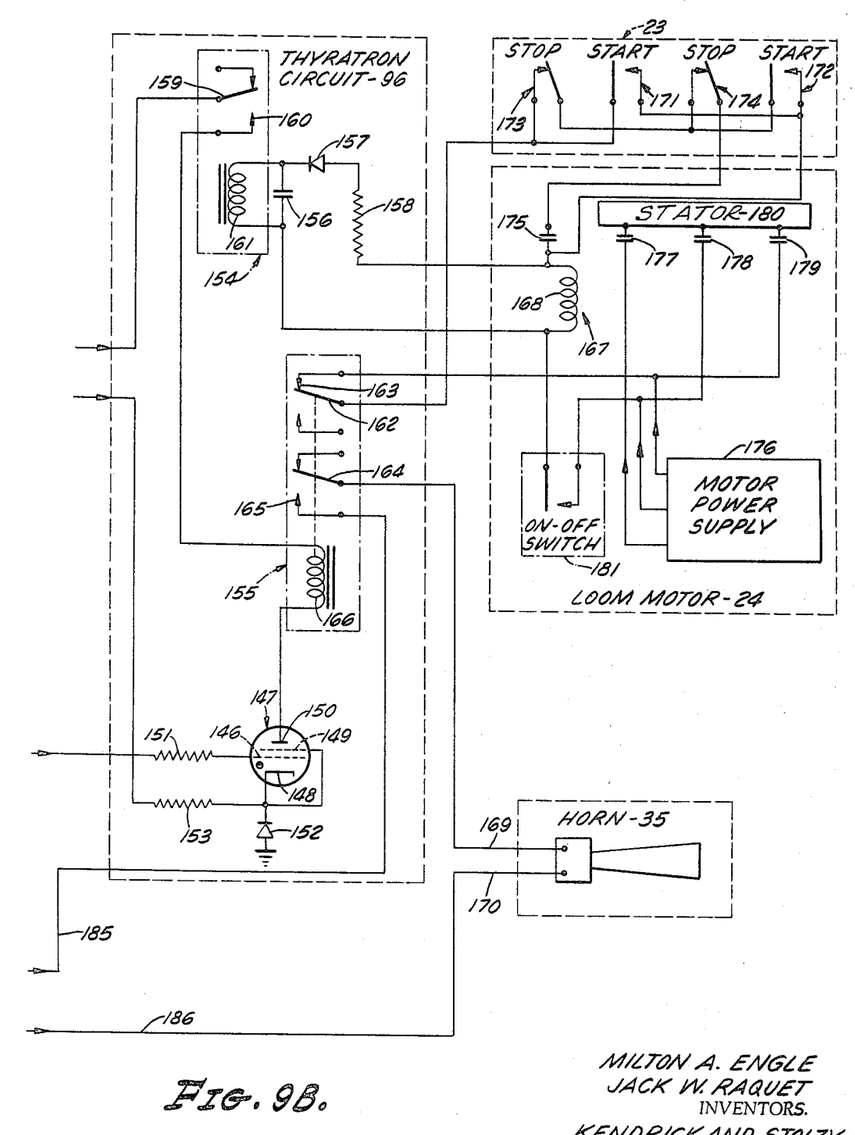

Cathode 140 in cathode follower 95 is connected to a control grid 146 of a thyratron 147 in thyratron circuit 96 through a resistor 151, as shown in FIG. 9B. Thyratron 147 has a cathode 148, a screen grid 149 connected thereto and an anode 150.

Thyratron cathode 148 is connected to ground through a Zener diode 152. A connection from power supply 98 is also made to thyratron cathode 148 through a resistor 153.

Thyratron circuit 96 includes relays 154 and 155, a storage capacitor 156, a diode 157, and a resistor 158.

Relay 154 has a pole 159 for engagement with a normally open contact 160. Relay 154 also has a winding 161. Relay 155 has a first pole 162 for engagement with a normally closed contact 163, and a second pole 164 for engagement with a normally open contact 165. Relay 155 has a winding 166.

Note will be taken that thyratron anode 150 is, upon the energization of relay 154, connected to power supply 98 as follows. Power supply 98 is connected to pole 159 which can engage normally open contact 160 of relay 154. Normally open contact 160 is connected to thyratron anode 150 through winding 166 of relay 155.

Loom motor 24 includes a contactor 167 having a winding 168. Winding 161 of relay 154 is effectively connected in parallel with contactor winding 158 except for a series connection of resistor 158 and diode 157. Capacitor 156 is connected in parallel with relay winding 161.

First pole 162 of relay 155 is connected to switch assembly 23. Normally closed contact 163 is connected to loom motor power supply 176.

Second pole 164 of relay 155 is connected to horn 35. Normally open contact 165 is connected to a 115 volt 60 cycle per second power supply.

The connection to horn 35 from thyratron circuit 96 is indicated at 169. The connection from regulator circuit 97 to horn 35 is indicated at 170. Connections 169 and 170 are both shown in FIG. 9B.

Switch assembly 23 is provided with start switches 171 and 172, and stop switches 173 and 174. In effect, start switches 171 and 172 are connected in parallel. Stop switches 173 and 174 are also effectively connected in series. Start switches 171 and 172 are connected in parallel with a pair of normally open, self-locking contacts 175 of contactor 167. Stop switches 173 and 174 are connected serially with contacts 175 from contactor winding 168 to first pole 162 of relay 155 in thyratron circuit 96. The reason that two start and stop switches are provided in switch assembly 23, is that it is desirable to be able to start and stop loom motor 24 from either one or both of the ends of the loom. One start switch and one stop switch are therefore provided at one end of the loom, and the other start switch and the other stop switch are provided at the other end of the loom.

Loom motor 24 has an independent three-phase power supply 176 which is connected through three normally open pairs of contacts 177, 178 and 179 to stator 180 of the motor. Single-pole, single-throw switch 181 is provided which is connected from contacts 178 to contactor winding 168.

Power supply 98 is connected in parallel with a secondary winding, not shown, of a regulating transformer 183 in the regulator circuit 97 shown in FIG. 9A. Regulating transformer 183 has a primary winding, not shown, with input leads 185 and 186 which are connected, respectively, to thyratron circuit 96 and horn 35 shown in FIG. 9B.

The input to power supply 98 is maintained at 118 volts ±1.0% by a "Sola" or other conventional type regulating transformer 183. Regulator circuit 97 has a single-pole, single-throw switch 187. Conventional unregulated 60 cycle per second power is supplied to input leads 188 and 189 to regulator circuit 97.

Power supply 98 has two transformers 190 and 191. These transformers have primary windings 192 and 193, respectively, that are connected to regulating transformer 183. Transformers 190 and 191 have secondary windings 194 and 195. Two diodes 196 and 197, and two resistors 198 and 199 are connected successively in series between the upper end of secondary 194 and pole 159 of relay 154. A diode 200, an inductor 201, and two resistors 202 and 203 are connected serially from the lower end of secondary winding 194 through resistor 113 to filament 106 of triode amplifier tube 103.

A center tap at 204 on secondary winding 194 is connected to ground. A lead 205 connects diodes 196 and 200. A capacitor 206 is connected from the junction of inductor 201 and resistor 202 to ground. A capacitor 207 is connected from the junction of resistors 202 and 203 to ground. A capacitor 208 is connected from the junction of resistors 198 and 199 to ground. The junction of resistors 198 and 199 at 209 is connected to thyratron cathode 148 through resistor 153. The junction between inductor 201 and resistor 202 at 210 is connected to the anode 139 of cathode follower triode 135. The junction between resistors 202 and 203 at 211 is connected to the anodes 122 and 123 of dual triode 118 in amplifier 94 through resistors 130 and 131, respectively.

The secondary 195 of transformer 191 in power supply 98 is connected to photocell cathode 99 through a series connection of resistor 212, diode 213, resistors 214, 215, 115 and 114. A gas regulating tube 216 is connected from the junction 217 of resistors 215 and 115 to ground. Transformer secondary 195 is connected to ground through a resistor 218 and a capacitor 219. A capacitor 220 has one connection at the junction 221 of diode 213 and resistor 214. Capacitor 220 has another connection at 222 with capacitor 219. A diode 223 is connected from the junction at 224 between resistor 212 and diode 213 to ground. A capacitor 220' has a connection with resistors 214 and 215 at a junction 221'. Capacitor 220' also has a connection to ground at a junction 222'.

Triode 103 in photomultiplier circuit 93 acts simply as an amplifier, the output of which is taken from anode 108 and impressed upon grid 117 in dual triode 118 of amplifier 94 through coupling capacitor 116.

The output of amplifier 94 is taken from anode 123 and impressed upon the control grid 134 of tube 135 through coupling capacitor 132 and diode 133. As positive pulses occur, capacitor 138 is charged rapidly through diode 133. Capacitor 138 is discharged slowly through resistor 137. Cathode follower circuit 95 and meter 145 thus become peak reading apparatus.

Milliammeter 145 is provided in cathode follower 95 so that the voltage causing thyratron 147 to fire may be monitored. The gain of amplifier 94 may be changed by adjustment of potentiometer 128. The output signal level of cathode follower 95 is adjusted to fire thyraton 147 immediately upon the reception of any light other than that small amount reflected from box 47. Diode 142 protects milliammeter 145.

Diode 152 in thyratron circuit 96 is a Zener diode which is back biased and maintained at a breakdown voltage by which the potential of thyratron cathode 148 is maintained at a constant value within very narrow limits.

Capacitor 156 connected in parallel with winding 161 of relay 154 continues the energization of relay 154 a short time after contactor 167 is de-energized. Current flow from capacitor 156 to winding 168 of contactor 167, upon de-energization thereof, is prevented by diode 157.

Contactor 167 and loom motor 24 may be energized by the momentary closing of either one of the start switches 171 and 172 in switch assembly 23. Contactor 167 and loom motor 24 may be de-energized at any time by the opening of either one of the stop switches 173 and 174.

In the operation of the circuit of the present invention shown in FIGS. 9A and 9B, the passage of a thread 25 through field of view 44 of telescope 32 will cause the output of photocell 31 to change and thereby change the potential of the control grid 102 of triode 103. The input to amplifier 94 coupled thereto through capacitor 116 will be a pulse composed of a direct current component and a 120 cycle per second ripple component. This will be due to the fact that the light output of fluorescent tube 58 illuminating a thread 25 varies as indicated at 225 in FIG. 10.

The 120 cycle per second ripple component of the output of amplifier 94 will then be detected by diode 133 in cathode follower 95. The output of cathode follower 95 taken at the cathode 140 of triode 135 then fires thyratron 147. Relay 155 is then energized and horn 35 blows momentarily as second pole 164 engages contact 165. At the same time, contactor 167 is de-energized because first pole 162 breaks engagement with contact 163. Thyratron 147 remains fired for a short time after contactor 167 is de-energized because thyratron anode 150 receives power through relay winding 166, contact 160 and pole 159 of relay 154. Relay 154 is kept energized by capacitor 156 a short time after contactor 167 is de-energized. Capacitor 156 does not keep contactor winding 168 energized due to the connection of diode 157 therebetween. The reason that thyratron anode 150 gets power, is that when contactor 167 is energized, relay 154 is energized therewith.

It will be appreciated that any conventional regulated power supply having the same performance characteristics may be substituted for power supply 98.

Figures 11, 12:
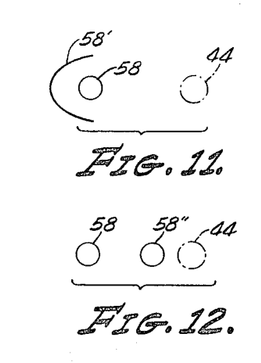
FIGS. 11 and 12 are diagramatic views of illuminating arrangements.

As shown in FIG. 11, a reflector 58′ may be employed with fluorescent tube 58 to focus light at field of view 44. Reflector 58′ may have the shape of an ellipse in cross section.

In FIG. 12, alternative to reflector 58′, a cylindrical glass rod 58″ is employed to focus light emanating from fluorescent tube 58 at field of view 44.

With the system as described in the foregoing, it is possible to detect the presence of a thread 25 having a diameter of .0022 inch anywhere along the length of field of view 44 when it is circular and has a diameter of one inch. The distance between telescope plate 41 and box plate 53 may be, for example, 18 feet. However, lens 40 will be constructed to focus an image or an object at box 47. The focal plane is located at the position of field stop 37. The prescription for lens 40 set forth herein is employed for a spacing between telescope 32 and box 47 of a wide range. A different pin hole size would therefore be selected for a spacing between telescope 32 and box 47 different from 18 feet.

Note will be taken that the length of fluorescent tube 58 and the lengths of lines 45 and 46 are not indicated in FIGS. 1 and 1A. On the other hand, they are in fact broken to indicate that the lengths thereof are substantially greater than the length of housing 30 and the length of box 47. The views of FIGS. 1 and 1A, although schematic, may nevertheless otherwise be considered to be to scale. For a distance between telescope end plate 41 and a box end plate 53 of 18 feet, the housing 30 of telescope 32 may be 16 inches long.

However, the length of telescope 32 is large in comparison to the cross section of field of view 44. The same is true of box 47. The long lengths of telescope 32 and box 47 compared with the small cross-sectional construction thereof, and end plates 42 and 53 and baffles 43, 54, 55, 56 and 57 make the system 20 of the present invention extremely sensitive. The dull black coating inside telescope 32 and box 47 also contributes to this high sensitivity. The same is true of the dull black external coating of box 47.

It is an outstanding feature of the present invention that the use of light choppers is avoided by employing a fluorescent lamp 58 which has an output as indicated at 225 in FIG. 10. This makes the use of alternating-current amplifiers possible, the drift of direct-current amplifiers causing unreliability. Notwithstanding the utility of this feature of the present invention, other features of the invention may be employed without this feature. In this event, direct-current amplifiers may be employed or electronic or optical choppers may be utilized. In particular, a source of illumination may be energized with an alternating signal or the light output from a constant light source may be chopped at that source.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. A yarn breakage detector for an automatic loom having a motor, said detector comprising: a first enclosure forming a first light trap and having one open end and one closed end; a second enclosure forming a second light trap and having one open end and one closed end, said open trap ends facing each other on a predetermined optical axis, said traps being spaced apart a distance so as to permit broken yarn to pass through the space between said traps, the said space between said traps being open and unoccupied to prevent interference with yarn passing therethrough; a photocell in said second trap adjacent the said closed end thereof facing said open end thereof; a telescope having a predetermined field of view, said telescope having a lens located in said second trap adjacent said photocell to converge light entering the open end of said second trap to a focus in the vicinity of said photocell, said second trap extending beyond said lens a predetermined distance; and a light source means spaced laterally from said optical axis outside of said field of view to provide continuous illumination of said field of view transverse thereto.

2. The invention as defined in claim 1, wherein said telescope provides an image of an object located at the position of said first trap, said telescope being positioned to provide said image at a position adjacent said photocell.

3. The invention as defined in claim 2, wherein said light means includes a cylindrical fluorescent tube having an axis parallel to and spaced from said optical axis outside of the field of view of said telescope.

4. The invention as defined in claim 3, wherein said light source means includes means for energizing said fluorescent tube with an alternating voltage at a power line frequency to provide a pulsating light output superimposed upon a predetermined continuous minimum light output.

5. The invention as defined in claim 1, wherein said second light trap has a mask in front of said lens, and a baffle at the said open end thereof, said mask and baffle each having substantially identical holes therethrough.

6. The invention as defined in claim 1, wherein each of said light traps has a plurality of partitions to divide said traps into light tight compartments, each of said partitions having a central hole therethrough, all of said holes being substantially of the same size, all of said holes being in registry with each other on said optical axis.

References Cited

UNITED STATES PATENTS

| | | | |
|---|---|---|---|
| 2,442,690 | 6/1948 | Hoffman et al. | 250—221 X |
| 2,813,230 | 11/1957 | Fruengel | 250—221 |
| 2,925,007 | 2/1960 | Silver | 250—218 X |
| 2,967,947 | 1/1961 | Flook | 250—219 X |
| 3,170,068 | 2/1965 | Petriw et al. | 250—218 X |

WALTER STOLWEIN, *Primary Examiner.*